(12) United States Patent
Acher

(10) Patent No.: US 8,908,180 B2
(45) Date of Patent: Dec. 9, 2014

(54) DEVICE AND METHOD FOR POLARIMETRIC MEASUREMENT WITH MICROSCOPIC RESOLUTION, POLARIMETRY ACCESSORY FOR A MICROSCOPE, ELLIPSOMICROSCOPE AND ELLIPSOMETRIC CONTRAST MICROSCOPE

(75) Inventor: Olivier Acher, Gif-sur-Yvette (FR)

(73) Assignee: Horiba Jobin Yvon SAS, Longjumeau (FR)

( * ) Notice: Subject to any disclaimer, the term of this patent is extended or adjusted under 35 U.S.C. 154(b) by 156 days.

(21) Appl. No.: 13/810,791

(22) PCT Filed: Jul. 18, 2011

(86) PCT No.: PCT/FR2011/051715
§ 371 (c)(1),
(2), (4) Date: Feb. 13, 2013

(87) PCT Pub. No.: WO2012/017158
PCT Pub. Date: Feb. 9, 2012

(65) Prior Publication Data
US 2013/0265576 A1    Oct. 10, 2013

(30) Foreign Application Priority Data
Jul. 19, 2010   (FR) ...................................... 10 55837

(51) Int. Cl.
*G01J 4/04*      (2006.01)
*G01J 4/00*      (2006.01)
*G02B 21/00*    (2006.01)

(52) U.S. Cl.
CPC .... *G01J 4/04* (2013.01); *G01J 4/00* (2013.01); *G02B 21/0092* (2013.01)
USPC ........................................................ 356/369

(58) Field of Classification Search
CPC ........................................................ G01J 4/04
USPC ........................................................ 356/369
See application file for complete search history.

(56) References Cited

U.S. PATENT DOCUMENTS

2008/0049226 A1*   2/2008   Mieher et al. ................. 356/401
2009/0284835 A1*   11/2009  Meshulach et al. ........... 359/489

FOREIGN PATENT DOCUMENTS

WO      2008/071822 A1    6/2008

OTHER PUBLICATIONS

Bueno, Juan M., Polarimetry in the human eye using an imaging linear polariscope, Journal of Optics A: Pure and Applied Optics, Institute of Physics Publishing, Feb. 28, 2002, pp. 553-561, IOP Publishing Ltd., United Kingdom.
International Search Report dated Nov. 23, 2011, for PCT/FR2011/051715 filed Jul. 18, 2011.
Written Opinion dated Dec. 2, 2011, for PCT/FR2011/051715 filed Jul. 18, 2011.

* cited by examiner

*Primary Examiner* — Roy M Punnoose
(74) *Attorney, Agent, or Firm* — Brooks Kushman P.C.

(57) ABSTRACT

A polarimetric measurement device and method with microscopic resolution include a polarization conversion device to modify the polarization of a beam so as to switch from a spatially uniform distribution to a distribution that is cylindrically symmetric about the optical axis, and vice versa. The conversion device is positioned on the axis of a focusing objective for focusing the cylindrically symmetric polarized beam onto the surface of a sample to be measured. The device may be incorporated into a microellipsometer, or an interference contrast microscope, or used as a polarimetric accessory for a microscope.

15 Claims, 7 Drawing Sheets

DEVICE AND METHOD FOR POLARIMETRIC MEASUREMENT WITH MICROSCOPIC RESOLUTION, POLARIMETRY ACCESSORY FOR A MICROSCOPE, ELLIPSOMICROSCOPE AND ELLIPSOMETRIC CONTRAST MICROSCOPE

CROSS-REFERENCE TO RELATED APPLICATION

This application is the U.S. national phase of PCT Appln. No. PCT/FR2011/051715 filed on Jul. 18, 2011, which claims priority to French Patent Application No. 1055837 filed on Jul. 19, 2010, the disclosures of which are incorporated in their entirety by reference herein.

The present invention relates to a microscopic resolution ellipsometer and an ellipsometric contrast microscope.

Firstly, the state of the art in the technical fields where the polarimetry and microscopy techniques are combined will be described.

a) Standard Ellipsometry

Ellipsometry is a well-known optical metrology technique, which makes it possible to obtain information about the optical properties of materials and thin film deposits, such as the refractive index of materials and/or the thickness of thin films. Ellipsometry is based on the analysis of the reflection (or the transmission) of a polarized light beam in oblique incidence on a sample to be studied. It is generally admitted that the sensitivity of an ellipsometer is maximum when the angle of incidence $8$ is close to the Brewster angle $\theta_B$, which, in a certain number of common materials, is comprised between 50 and 65°.

Figure 1:
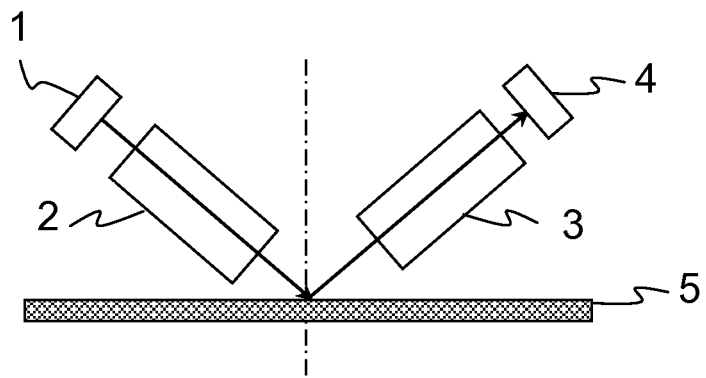

FIG. 1 schematically shows a standard ellipsometer comprising a light source 1, an illumination arm 2 that comprises polarizing optical components so as to define the polarization state of the incident beam, and an analysis arm 3 that comprises polarizing optical components capable of analyzing the polarization state of the beam reflected or transmitted by a sample 5.

Various types of ellipsometers are known, for example:
the nulling ellipsometer, which is based on the setting of polarization control components in the illumination and/or analysis arm for extinguishing the signal at the sensor 4;
the rotating-polarizer or rotating-compensator ellipsometer, which is based on the rotation of a polarization control component, such as a polarizer or a birefringent plate;
the polarization modulation ellipsometer, which is based on the use of an active component, such as a photoelastic modulator, to modulate the polarization state of the light as a function of time;
the Mueller ellipsometer or Mueller meter, which allows the complete measurement of the Mueller matrix parameters of a sample (cf., for example, the "MM16" ellipsometer of HORIBA Jobin Yvon, which performs a series of measurements for different polarization states obtained by activating several liquid crystal systems).

Certain elliptometers are suited for the quantitative measurement of the ellipsometric signal at a given point of the sample, corresponding to the focus point of the beam incident on the sample. The ability to measure this ellipsometric signal over an extended wavelength range is an asset: it is then referred to as a spectroscopic ellipsometer. Other types of ellipsometers, referred to as ellipsometric imaging devices, make it possible to obtain images by collecting the ellipsometric signal on a camera.

One objective of the last years is to make an ellipsometer with a very small spot size.

Another objective is to provide high resolution ellipsometric images thanks to a microscope objective.

However, combining the ellipsometry and microscopy techniques poses a number of problems about optical configurations.

b) Microscope-Ellipsometer Under Oblique Incidence

According to a first approach, a microscope is also known, which operates under oblique incidence and which comprises two objectives of rather limited numerical aperture and polarization control devices arranged upstream and downstream, respectively, of the unit (illumination objective—sample—receiving objective). However, this microscope has the drawback that the objectives do not operate under normal incidence but according to an axis that is inclined with respect to the sample. Yet, the size of the objectives imposes a relatively great minimum working distance with respect to the sample, which limits the accessible magnification. Moreover, this configuration does not makes it possible to get focus over the whole field of the sample, due to the low depth of field of the objectives and to the variations of distance between the objective plane and the inclined sample (See, for example, "Microscope at Brewster Angle . . . ", S. Hénon et J. Meunier, Rev. Sci. Instrum. 62, 936 (1991); or "Description of a singular modular optical setup for ellipsometer, surface plasmons, waveguide modes, and their corresponding imaging techniques including Brewster Angle microscopy", M. Harke et al., Rev. Sci. Instrum. 68 3130 (1997)).

c) Microscope and Normal Incidence Polarization

The alliance of microscopy with polarized light includes a certain background. For instance, the polarized light observation between a polarizer P and an analyzer A is conventional. It is rather common to add phase plates in the optical path.

Distinction is made between orthoscopic and conoscopic microscopy observations. In orthoscopic mode, the aperture diaphragm is highly closed, so as to select the rays incident on the sample under an incidence close to the normal. On the contrary, in conoscopic mode, the interest is focused on the light incidence effects, the aperture diaphragm is open, and the field diaphragm is closed so as to analyze only a small portion of the sample. Such polarized light microscopy methods are essentially used for the study of birefringent samples.

It will be noted here that such microscopic configurations do not make use of the great sensitivity of the oblique incidence polarized light reflection, which is at the origin of the success of ellipsometry, including on non-birefringent samples. This illustrates the current limits of the polarized light microscopy. The fundamental reasons of the little use of the oblique incidence polarized light microscopy are probably related to the difficulties to analyze the signals after reflection. Indeed, so that the ellipsometry sensitivity can be fully used, the interest must be focused on the changes of polarization upon reflection not with respect to an arbitrary direction perpendicular to the optical axis of the microscope, but with respect to a plane of incidence. Yet, the microscope objective creates a multitude of planes of incidence, and thus a multitude of orientations of the polarization with respect to these planes, even though the illumination polarization has been selected by a spatially homogeneous polarizer, or even a combination of a linear polarizer with a birefringent plate.

The effects linked to the multitude of planes of incidence may be ignored when all the rays incident on the sample are close to the normal. However, as soon as the numerical aperture of the objective becomes high (typically higher than 0.6), these effects become predominant. Yet, objectives whose numerical aperture reaches 0.8 or 0.95 are commonly used.

A way to free from the effects linked to the multiplicity of planes of incidence is to make use of the properties of substrates having particular optical properties, such that, for the considered incidence range, the substrate modifies very little the incident polarization state whatever the orientation of the plane of incidence.

Therefore, the patent FR2841339 describes the use of a substrate having particular optical properties ("Supports anti-réfléchissants et supports amplificateurs de contraste pour la lumière polarisée en réflexion", D. Aussere et al.,) so that the reflected light polarization is independent of the azimuth of the plane of incidence. However, it is true only for common substrates. Yet, the solution of non-depolarizing substrates proposed hereinabove operates rigorously for only one angle of incidence. The considered incidence range is then reduced and cannot in any way be extended to high numerical apertures.

d) Radial Selection Micro-Ellipsometer

An ellipsometer theoretically operates with a plane wave polarized light beam (i.e. with a zero aperture) in a plane of incidence and under a non-zero angle of incidence with respect to the normal to the sample. On the other hand, a microscope generally uses a light beam, the aperture of which is high and the axis of which is perpendicular to the surface of the sample. Of course, to illuminate a sample with a given angle of incidence through a microscope objective, it is simple to select, using an annular diaphragm on the illumination beam, an incident light ring corresponding to the chosen angle of incidence. However, in this case, a microscope then does not comprise a single plane of incidence, but a multitude of planes of incidence, each of the planes of incidence being defined by an azimuth angle about the axis of the objective. If the incident beam has a spatially uniform polarization distribution, the orientation of the polarization with respect to each plane of incidence becomes non uniform after being reflected on the sample and having passed through the objective, which interferes with the ellipsometric measurement.

e) Azimuthal Resolution Micro-Ellipsometer

To solve the problem linked with the multiplicity of planes of incidence, a solution known in the field of microscopy consists in keeping only a small part of the illumination beam, using a diaphragm placed on the incident beam to select only one azimuth. This solution has of course a major drawback in terms of luminosity.

Another known solution consists in spatially resolving the signal on an imaging sensor as a function of the azimuth and/or using a digital processing of the signal.

It may also be contemplated not to use a diaphragm and to collect all the information on an imaging device, each pixel of which corresponds to an angle of incidence and an azimuth (cf. for example "Angle-resolved annular data acquisition method for microellipsometry", Sang-Neon Ye et al., Optics Express 15 (2007) 18056). The drawback of this solution is that complex calculations are required to extract the ellipsometric data. Such configuration is not simple to use for imagery. Moreover, the measurement configuration is optimal for only one azimuth, and not for all of these azimuths. Finally, an additional difficulty relates to the quantitative calibration of this apparatus.

The U.S. Pat. No. 6,698,511, J. R. Leger and Q. Z. Zhan, describes an imaging ellipsometer based on the use of a single microscope objective and of spatial filters. It will be noted that, in this device, the illumination of the sample is made with a uniformly and linearly polarized light. Another example is disclosed in the U.S. Pat. No. 6,275,291 ("Micropolarimeter and ellipsometer", M. Abraham and M. Eberhardt), which describes a set of micro-ellipsometers processing the beam passing through the objective as a multitude of different beams, analyzed respectively by a multitude of microscopic ellipsometers.

f) Radial Symmetry Microscope and Ellipsometer

Other configurations have also been proposed. For example, Qiwen Zhan and James Leger have proposed an ellipsometer having a radial symmetry adapted to the symmetry of an objective about the optical axis of the microscope: "*Microellipsometer with Radial symmetry, Qiwen Zhan and James R. Leger*", Applied Optics 41, 4630 (2002). The choice shown in this publication is to illuminate with a circular polarization state, spatially uniform over the whole area of illumination, and to analyze the reflected beam by means of a radial analyzer. A radial analyzer is an optical component that lets through the linear polarization component that is locally oriented radially with respect to the center of this radial analyzer, whose optical axis is itself aligned with the optical axis of the objective. More recently, this same principle of illumination by means of a uniformly circularly polarized beam and of analysis by means of a non-uniform radial symmetry analyzer placed in front of a matrix sensor, has been applied to make a micro-ellipsometer ("High spatial resolution nulling microellipsometer using rotational polarization symmetry", Alain Tschimwang and Qiwen Zhan, Applied Optics 49, 1574 (2010)). The document U.S. Pat. No. 6,693,711 (*Ellipsometer using radial symmetry*, J. R. Leger and Q. Z. Zhan) describes other concepts of radial symmetry micro-ellipsometers. All these concepts are based on the use of an illumination whose polarization is of radial symmetry and have the particularity to operate on the reflected signal of radial symmetry polarization, to generate an ellipsometric signal that is also of radial symmetry. The optical detection is then made on a signal having a spatial distribution of radial symmetry. Yet, working on a beam spatially distributed according to a radial symmetry to generate an ellipsometric signal, which is too of radial symmetry, is not easy, because most of the known and mastered ellipsometric configurations are based on the use of a beam with a spatially uniform polarization state distribution. Moreover, even if it is possible to use beams with a non-uniform spatial polarization state distribution, the great majority of the optical polarization control components are components having two eigen axes in the plane whose orientation and effects are uniform over an optical beam. Therefore, the quarter-wave plates, the polarizers, the modulators or the compensators commonly used to make ellipsometers, have two eigen axes in a plane transverse to the optical axis of the beam, and are not suited to the generation of an ellipsometric signal with a polarization state distribution of radial symmetry.

Also, even if the principle proposed by Zhan and Leger has the advantage that it respects the radial symmetry of a microscope objective, having to make an ellipsometer with a radial symmetry, from the illuminator to the sensor, is a great drawback.

g) Radial Polarization Converter

To generate an incident beam with a polarization state distribution of radial symmetry, or to radially analyze a polarization state distribution, a radial polarization converter is used instead of a standard linear polarizer. Polarization converters are known, which are used in particular in microscopy to make a radial polarization illumination, which has some interests: making an illumination according to the Brewster angle and for the polarization that is not reflected at this angle (US2006/0268265, Yung-Ho Chuang et al., "reducing variation in energy reflected from a sample due to thin film interference"); a microscope of the confocal type using different radial symmetry polarizations for the illumination (patent application US2009/0284835, Doron Meshulah et al., "Scanning-microscopy using inhomogeneous polarizations"); a better focusing (US2010/0007863 C. Jorsdanoska); and various applications presented in (Advances in Optics and Photonics, vol. 1, pp 1-57 (2009), par Qiwen Zhan).

Of course, a radial polarization converter makes it possible to transform the spatial distribution of a polarization state, so as to switch from a spatially uniform linear polarization state to a linear polarization state with a radial distribution, when an axis of the converter is aligned with the input uniform polarization state, or respectively to generate a linear polarization state with an azimuthal distribution, when an axis of the converter is oriented perpendicular relative to the input uniform polarization state.

However, in ellipsometry, it is tried to explore the variation of the ratio $r_p/r_s$ upon reflection or refraction on the surface of a sample. In a standard ellipsometer, the input polarizer is thus oriented at 45° relative to the axes of the plane of incidence to explore both the polarization state p and the polarization state s.

However, a radial converter does not easily permit to combine two transverse linear polarization states.

Likewise, a radial polarization analyzer makes it possible to analyze the polarization state either according to a linear polarization state (p) or according to the linear state of polarization (s), but does not make it possible to obtain information about the modification of the ratio $r_p/r_s$.

In the radial analyzer ellipsometers, the sample and the radial polarization converter affect the output signal.

A radial polarization converter modifies not only the spatial distribution of a polarization state, but also the polarization state itself in a spatially non-homogeneous manner. Only one linear polarization state, either parallel or perpendicular to an eigen axis of a radial converter, keeps in output a linear polarization state with a radial, or respectively azimuthal, distribution.

Any input uniform polarization state of a radial converter that is not a linear polarization state is transformed into a polarization state distribution that is generally not of radial symmetry.

The invention aims to remedy the drawbacks of the prior art devices and to propose to increase the spatial resolution of an ellipsometer while keeping a high luminosity; an imaging ellipsometer providing high quality ellipsometric measurements; a microscope compatible with ellipsometric measurements resolved as a function of both the incidence angle and the azimuth angle; a method of high spatial resolution (micrometric or sub-micrometric) polarimetric measurement.

The invention relates to a microscopic resolution polarimetric measurement device comprising:
an excitation part comprising:
a light source capable of emitting an incident light beam over a wavelength domain, and
a polarization state generator capable of generating an incident optical beam having a spatially uniform polarization state distribution;
first polarization conversion means capable of receiving said incident optical beam of spatially uniform polarization and of converting the latter into a beam with a polarization vector distribution of cylindrical or semi-cylindrical symmetry about the optical axis and according to which each polarization vector comprises a linear combination of a non-zero radial component and a non-zero azimuthal component;
optical focus means having an optical axis to focus said cylindrical symmetry polarization beam on the surface of a sample to be measured, said optical axis being merged with the normal to the sample;
an analysis part comprising:
optical collection means for collecting the light beam reflected or transmitted by the sample, said optical collection means having an optical axis merged with the optical axis of said reflected or transmitted light beam;
second polarization conversion means arranged so as to receive said collected light beam, said second polarization conversion means being capable of converting a beam with a polarization vector distribution of cylindrical symmetry according to which a polarization vector comprises a linear combination of a radial component and an azimuthal component of polarization into a beam with a spatially uniform polarization state distribution;
a polarization state analyzer capable of receiving the optical beam converted by the second polarization means and of analyzing the polarization state of said optical beam according to a cartesian polarization state basis;
detection means capable of receiving said light beam that is polarization analyzed by the analyzer.

According to a particular embodiment, the first polarization conversion means and the second polarization conversion means are formed by a single polarization converter used in two opposite directions of propagation, and said optical focus and collection means are merged.

According to a particular embodiment, said polarization converter is a liquid crystal converter comprising a cartesian symmetry face and a cylindrical symmetry face.

According to a particular embodiment, said polarization converter is a polarization converter capable of converting the polarization state distribution from a cartesian to a cylindrical system, while keeping the polarization state of the beam.

According to a particular embodiment, the polarization state generator is a spatially uniform linear polarizer, and the polarization axis of said linear polarizer is oriented with respect to an eigen axis of the first polarization conversion means so as to form a non-zero angle.

According to a particular embodiment, the polarization state analyzer is a spatially uniform linear analyzer and the polarization axis of said linear analyzer is oriented with respect to an eigen axis of the second polarization conversion means so as to form a non-zero angle.

According to various aspects of particular embodiments, the polarimetric measurement device further comprises:
optical means for separating the beam incident on the sample from the beam reflected or transmitted by the sample, said optical separation means being arranged in the optical path between the polarization state generator and the polarization converter;
a field diaphragm, an aperture diaphragm and/or means for spectroscopic analysis of the detected signals;
a Nomarski prism, the converter being located between the Nomarsky prism and said optical focus means.

According to a particular embodiment, said polarimetric measurements are ellipsometric measurements, Mueller ellipsometry measurements or scatterometry measurements.

The invention also relates to a polarimetric accessory for a microscope, comprising:

a polarization state generator capable of receiving an incident optical beam and of generating an optical beam having a spatially uniform polarization state distribution;

a radial or cylindrical polarization converter capable of converting a beam propagating in a first axial direction of propagation and having a spatially uniform polarization state distribution into a beam with a polarization vector distribution of cylindrical symmetry about the optical axis, and reciprocally said converter being capable of converting a beam propagating in a second axial direction, counter-propagative to the first direction, and having a polarization vector distribution of cylindrical symmetry about the optical axis into a beam with a spatially uniform polarization state distribution;

a polarization state analyzer according to a cartesian polarization state basis;

said converter being arranged in the optical path, on the one hand, between the polarization state generator and the microscope objective, and on the other hand, between the microscope objective and the polarization state analyzer.

The invention also relates to an imaging microscope-ellipsometer comprising an accessory according to an embodiment of the invention, a microscope objective of numerical aperture higher than or equal to 0.7, and an imaging sensor.

The invention also relates to an ellipsometric contrast microscope comprising an accessory according to an embodiment of the invention, comprising:

a first converter to direct an optical beam toward a sample to be measured, a second converter to direct the optical beam reflected or transmitted by the sample toward a reference substrate, said first and second converters having their eigen axes oriented at 90 degrees relative to each other.

Finally, the invention also relates to a polarimetric measurement method comprising the steps of:

generating an incident light beam having a spatially uniform polarization state distribution;

converting the polarization vector distribution of said incident beam into a polarization state distribution having a cylindrical or semi-cylindrical symmetry about the optical axis, according to which each polarization vector comprises a linear combination of a non-zero radial component and a non-zero azimuthal component;

focusing said cylindrical or semi-cylindrical symmetry polarization beam on the surface of a sample to be measured according to an optical axis merged with the normal to the sample;

collecting the light beam reflected or transmitted by the sample;

converting the spatial polarization state distribution of the collected beam so as to convert a polarization state distribution of cylindrical symmetry about the optical axis into a spatially uniform polarization state distribution;

analyzing the polarization state of the collected and polarization converted beam;

detecting the analyzed beam.

According to a particular embodiment, the polarimetric measurement method further comprises one of the following steps:

spectroscopically analyzing the detected beam;

detecting an image of the sample surface on an imaging sensor; and/or detecting an image of an optically conjugated plane of the sample surface.

To say it differently, the invention relates to an amplitude and phase polarimetric measurement device of the ellipsometric measurement or Mueller ellipsometry measurement or scatterometric measurement type, said microscopic resolution polarimetric measurement device comprising:

an excitation part comprising:

a light source capable of emitting an incident light beam over a wavelength domain, and a polarization state generator capable of generating an incident optical beam having a spatially uniform polarization state distribution;

optical focus means having an optical axis to focus said incident light beam on the surface of a sample to be measured;

an analysis part comprising:

optical collection means for collecting the light beam reflected or transmitted by the sample, said optical collection means having an optical axis;

a polarization state analyzer capable of receiving the optical beam collected by said optical collection means and of analyzing the polarization state of said optical beam according to a cartesian polarization state basis;

detection means capable of receiving said light beam that is polarization analyzed by the analyzer;

said polarization state generator and/or said polarization state analyzer further comprising polarization modulation means.

According to the invention, said optical focus means are arranged so that said optical axis of said optical focus means is merged with the normal to the sample; said optical collection means are arranged so that said optical axis of said optical collection means is merged with the optical axis of said reflected or transmitted light beam; the excitation part comprises first polarization conversion means arranged between said polarization state generator and said optical focus means, said first polarization conversion means being oriented so as to receive said incident optical beam of spatially uniform polarization and to convert it into a beam with a polarization vector distribution of cylindrical or semi-cylindrical symmetry about the optical axis and according to which each polarization vector comprises a linear combination of a non-zero radial component and a non-zero azimuthal component; and the analysis part comprises second polarization conversion means arranged between said optical collection means and said polarization state analyzer, said second polarization conversion means being oriented so as to receive said collected light beam, said second polarization conversion means being capable of converting a beam with a polarization vector distribution of cylindrical symmetry according to which a polarization vector comprises a linear combination of a radial component and an azimuthal component of polarization into a beam with a spatially uniform polarization state distribution.

According to a particular aspect of the device of the invention, said polarimetric measurements are ellipsometric measurements, Mueller ellipsometry measurements or scatterometry measurements, the matrix of said polarization conversion means that expresses the coordinates, in the cylindrical system, of the polarization of a beam emerging from the cylindrical symmetry face, as a function the coordinates, in the cartesian system, of the polarization of the beam incident on the cartesian symmetry face, being of the diagonal type:

$$M_{xy \to \varphi r} = \alpha \begin{pmatrix} 1 & 0 \\ 0 & \beta \end{pmatrix}$$

where the coefficients α, β of this matrix are uniform in each half of the component.

The invention also relates to an amplitude and phase polarimetric measurement accessory of the ellipsometric measurement or Mueller ellipsometry measurement or scatterometric measurement type, for a microscope, comprising:
  a polarization state generator capable of receiving an incident optical beam and of generating an optical beam having a spatially uniform polarization state distribution;
  a polarization state analyzer according to a cartesian polarization state basis;
  polarization modulation means arranged between said polarization state generator and said polarization state analyzer, and
  a radial or cylindrical polarization converter arranged in the optical path, on the one hand, between the polarization state generator and the microscope objective, and on the other hand, between the microscope objective and the polarization state analyzer,
  said converter being oriented with respect to the polarization state generator so as to convert a beam propagating in a first axial direction of propagation and having a spatially uniform polarization state distribution into a beam with a polarization vector distribution of cylindrical symmetry about the optical axis, according to which each polarization vector comprises a linear combination of a non-zero radial component and a non-zero azimuthal component, and reciprocally said converter converting a beam propagating in a second axial direction, counter-propagative to the first direction, and having a polarization vector distribution of cylindrical symmetry about the optical axis into a beam with a spatially uniform polarization state distribution.

The invention also relates to a method for amplitude and phase polarimetric measurement of the ellipsometric measurement or Mueller ellipsometry measurement or scatterometric measurement type, comprising the steps of:
  generating an incident light beam having a spatially uniform polarization state distribution;
  converting the polarization vector distribution of said incident beam into a polarization state distribution having a cylindrical or semi-cylindrical symmetry about the optical axis, according to which each polarization vector comprises a linear combination of a non-zero radial component and a non-zero azimuthal component;
  focusing said cylindrical or semi-cylindrical symmetry polarization beam on the surface of a sample to be measured according to an optical axis merged with the normal to the sample;
  collecting the light beam reflected or transmitted by the sample;
  converting the spatial polarization state distribution of the collected beam so as to convert a polarization state distribution of cylindrical symmetry about the optical axis into a spatially uniform polarization state distribution;
  analyzing the polarization state of the collected and polarization converted beam;
  detecting the analyzed beam.

The invention will find a particularly advantageous application in the fields of micro-ellipsometry, ellipsometric contrast microscopy, or micrometric resolution ellipsometric imaging.

The present invention also relates to the features that will be revealed by the following description and that will be considered either alone or in any technically possible combination thereof.

Figure 2:
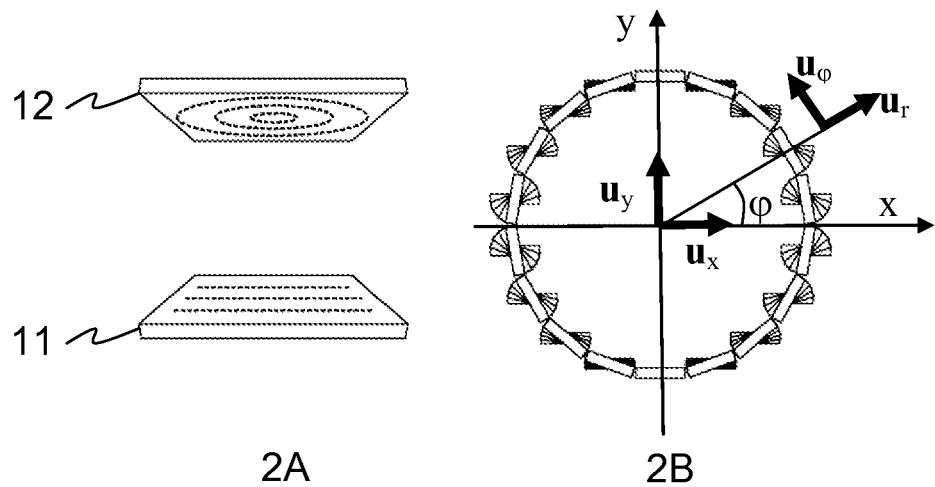
Figure 3:
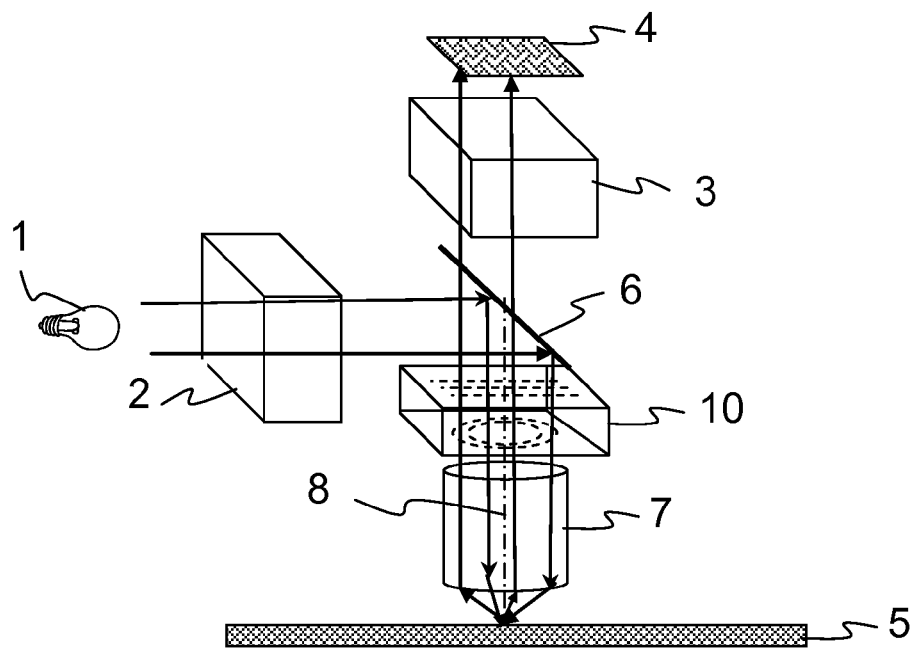
Figure 6:
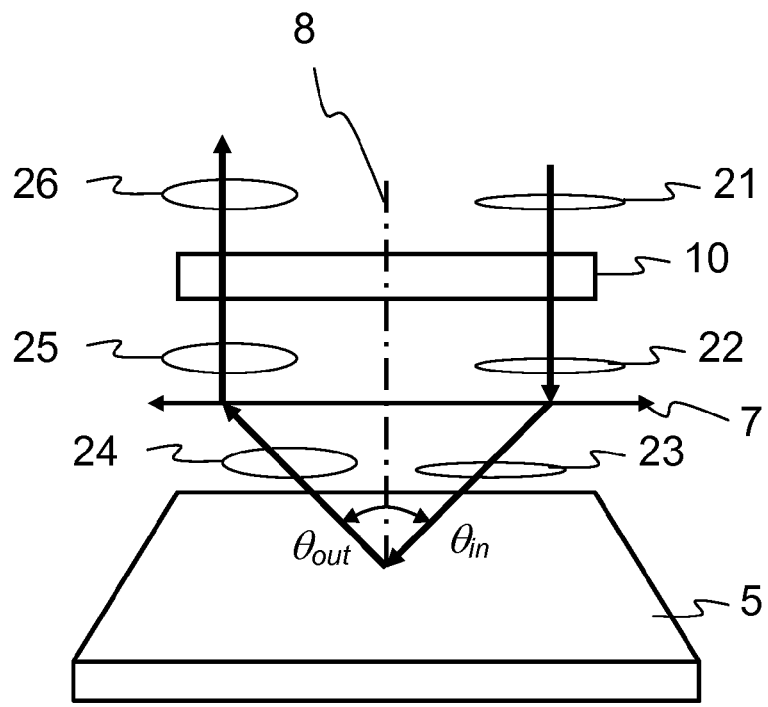
Figure 4:
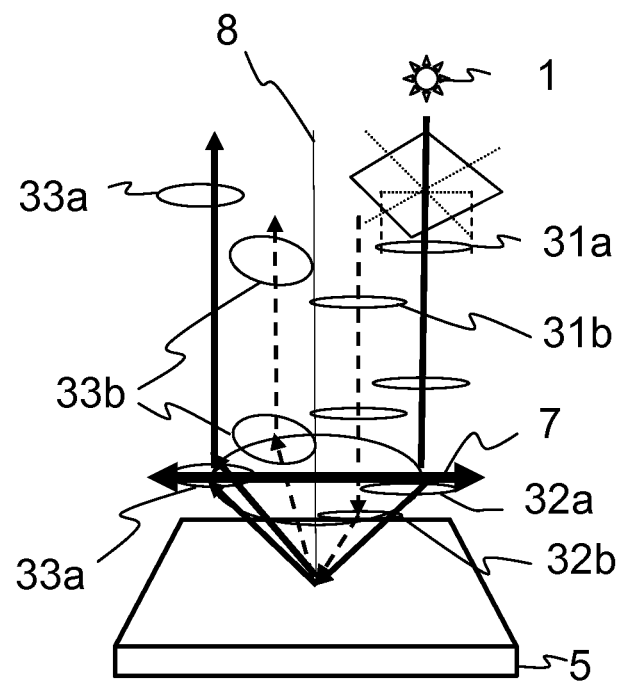
Figure 5:
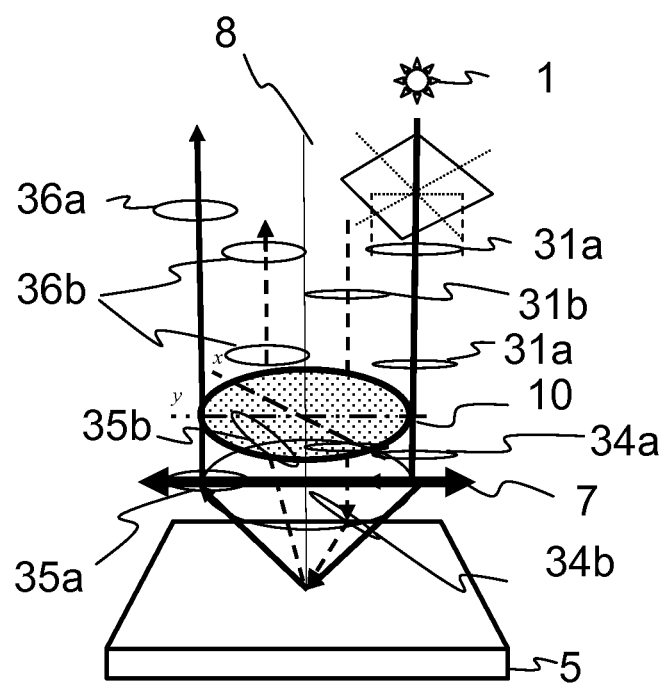
Figure 7:
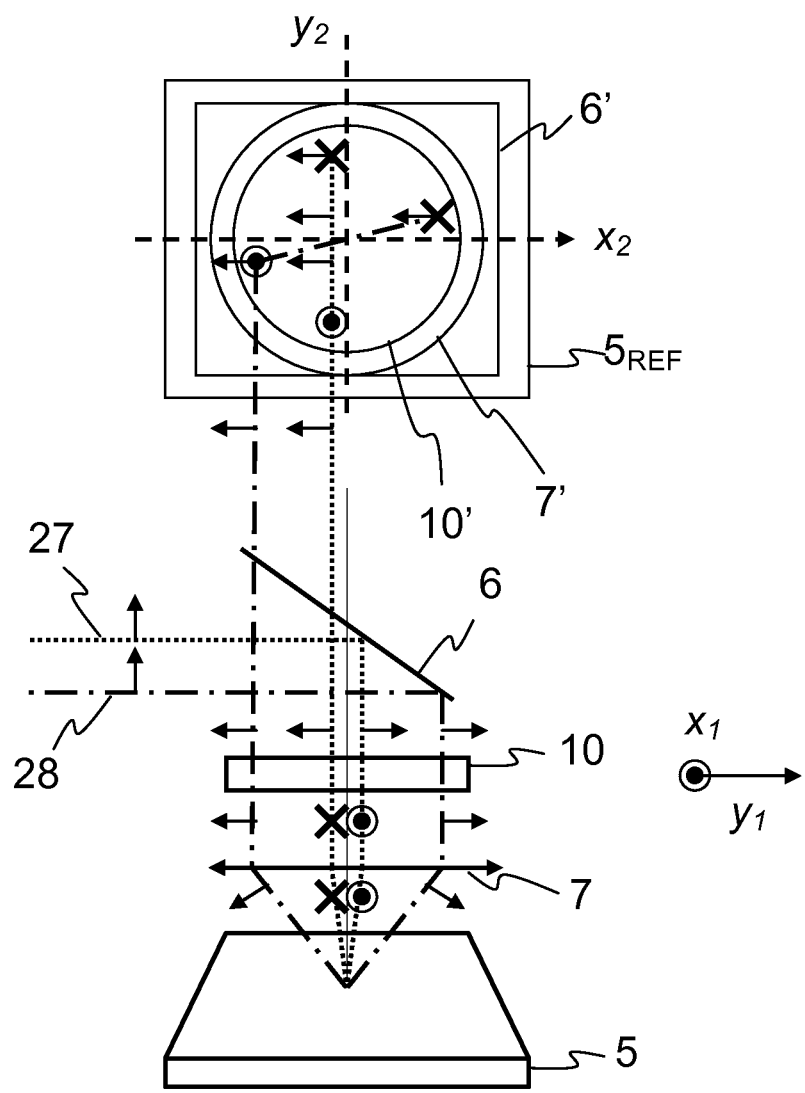
Figure 8:
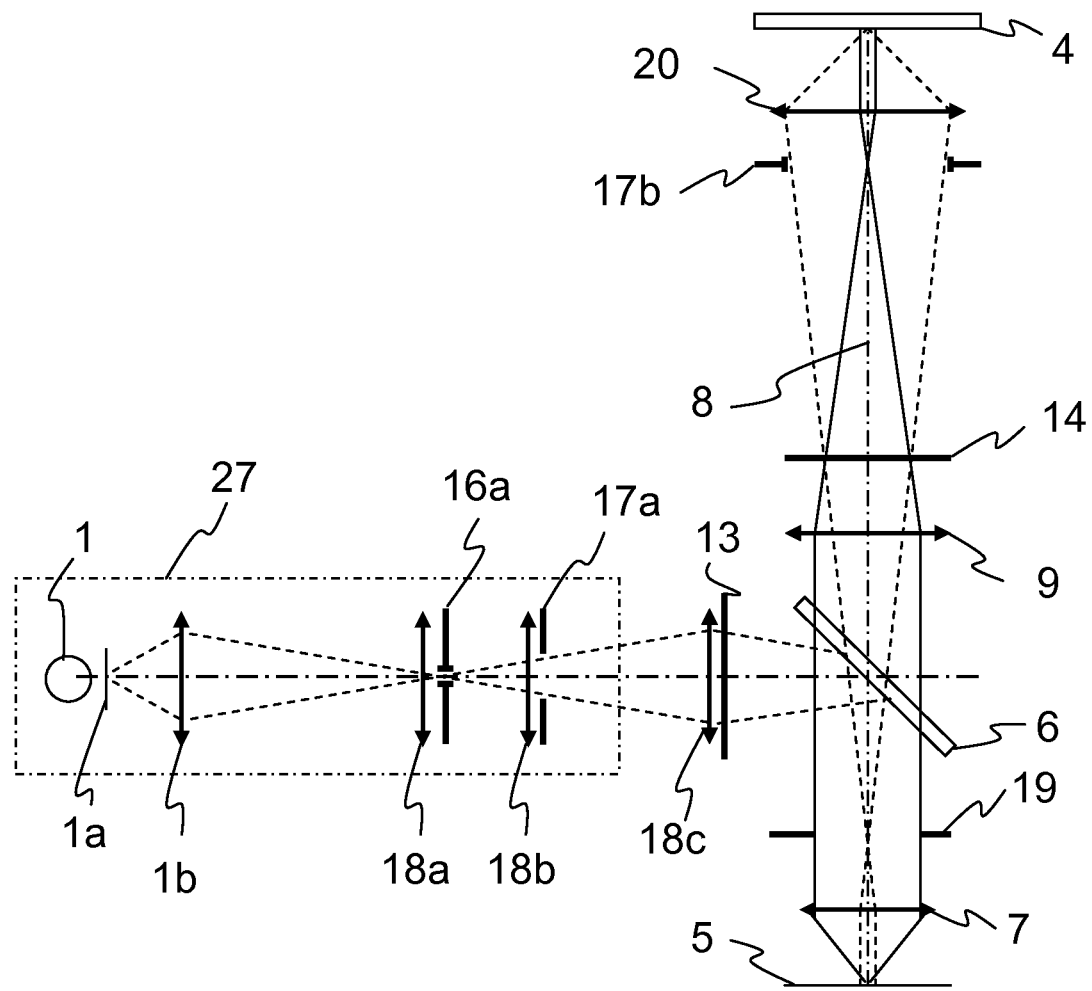
Figure 9:
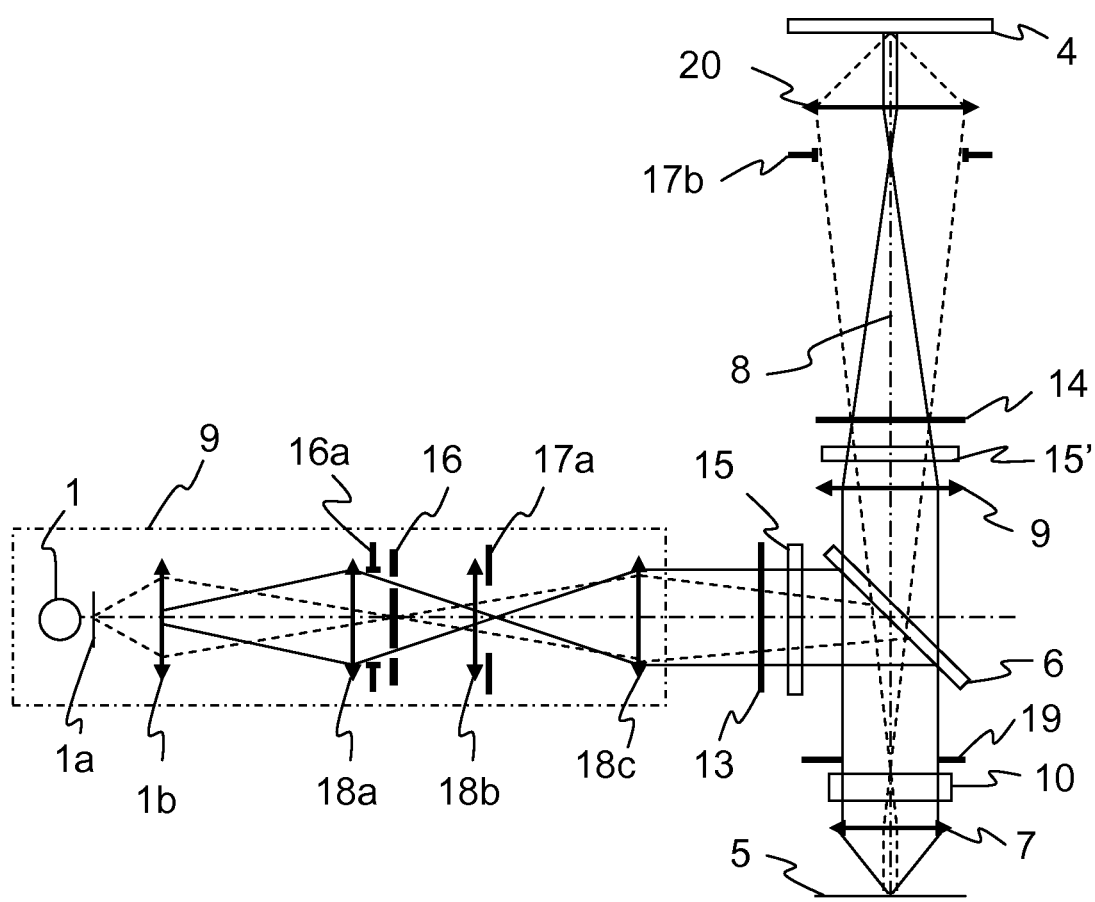
Figure 10:
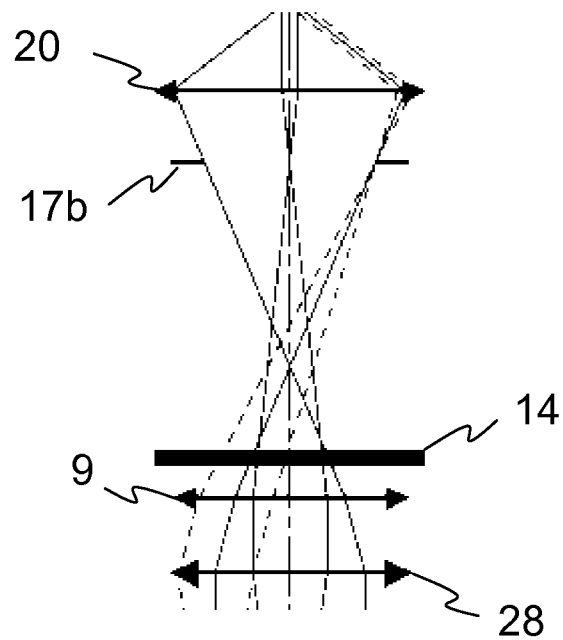
Figure 11:
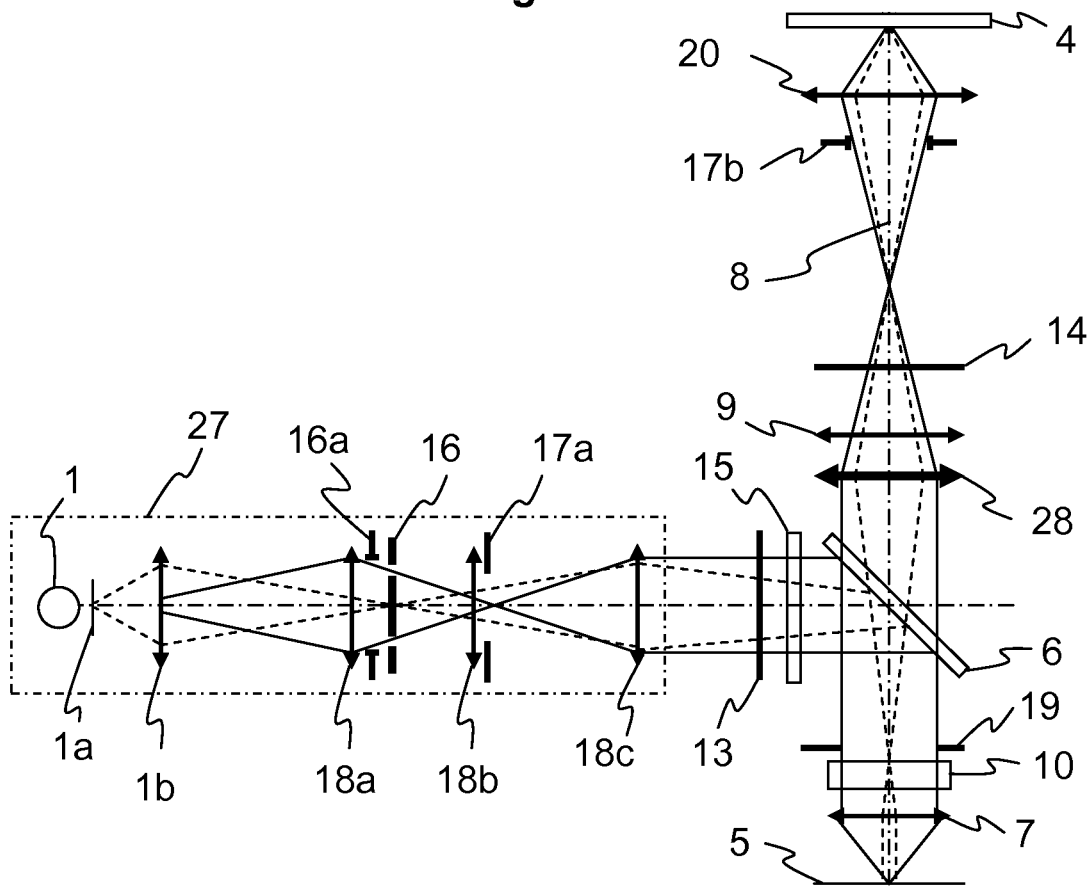

This description is given by way of non-limitative example and will allow a better understanding of how the invention can be implemented, with reference to the appended drawings, in which:

FIG. 1 schematically shows an ellipsometer;

FIG. 2A schematically shows, in an exploded view, the two faces of a cartesian-cylindrical polarization converter known in the prior art; FIG. 2B schematically shows a projection to a plane transverse to the optical axis of the cartesian and cylindrical systems associated with the two faces 11 and 12, respectively, of the converter, as well as the orientation of the liquid crystal axes to switch from one face to the other face of the converter;

FIG. 3 schematically shows a micro-ellipsometer according to an embodiment of the invention;

FIG. 4 schematically shows the propagation of a beam of uniform polarization through a microscope objective and after reflection on a sample;

FIG. 5 schematically shows the propagation of a beam of uniform polarization through a device according to an embodiment of the invention;

FIG. 6 schematically shows the propagation of a polarized beam through a converter and a microscope objective in some plane of incidence or other;

FIG. 7 schematically shows the propagation of a polarized beam through an ellipsometric contrast microscope device according to an embodiment of the invention;

FIG. 8 schematically shows a sectional view of an episcopic illumination microscope, operating in polarized light mode, according to the prior art;

FIG. 9 schematically shows a sectional view of an ellipsometric microscope according to an embodiment of the invention;

FIG. 10 schematically shows a sectional view of the detection part of a microscope according to a particular embodiment of the invention;

FIG. 11 schematically shows a sectional view of an ellipsometric microscope according to an embodiment of the invention using the detection part shown in FIG. 10.

The invention is based on the use of a component referred to as the "cartesian to cylindrical" polarization converter and of a polarization analyzer.

According to an embodiment of the invention, in a particular configuration, a liquid crystal polarization converter, such as described in particular by Stalder et al. Opt. Lett. 21 p. 1948 (1996), is used. FIG. 2A schematically shows, in an exploded view, the two faces of such a liquid crystal cartesian-cylindrical polarization converter. Such a liquid crystal polarization converter comprises two distinct faces denoted in the present document by cartesian face 11 and cylindrical face 12, respectively. The cartesian face 11 comprises two eigen axes, oriented at 90° relative to each other. These eignen axes are denoted by $u_x$ and $u_y$, one of the axes $u_x$, $u_y$ being an axis of alignment of the liquid crystals. The "cylindrical" face comprises a center O and it is convenient to associate therewith a cylindrical coordinate system (centered to O) $u_\varphi$, $u_r$. FIG. 2B shows a projection to a plane transverse to the optical axis of the cartesian and cylindrical systems associated with the two faces 11 and 12, respectively, of the converter, as well as the orientation of the liquid crystal axes to switch from one face to the other face of the converter. The polarization converter receives on its cartesian face 11 an incident beam parallel to its optical axis. According to Stalder et al., it is known that, when the beam incident on the cartesian face is linearly polarized, with a uniform polarization, the axis of the incident polarization being aligned on one of the axes $u_x$, or respectively $u_y$, the converter transforms this beam into a radial, or respectively azimuthal, polarization beam. More generally, when the beam incident on the cartesian face has a spatially uniform polarization of the type: $a.u_x+b.u_y$ (expressed in the cartesian basis), the converter transforms this uniform polarization incident beam into a beam emerging from its cylindrical face, of non-uniform polarization, but whose polarization state distribution is of cylindrical symmetry about the optical axis and that is expressed (in the cylindrical basis) by $[a.u_\phi-b.\exp(j.\chi).u_r]*\text{Sign}(-y)$. The factor $\exp(j.\chi)$ expresses the fact that there may be a phase shift $\chi$ between the radial component and the azimuthal component of the wave, this phase shift being introduced during the passing through the polarization converter. The coefficient $\text{Sign}(-y)$ is equal to $-1$ if y is positive (or, which comes to the same thing, if $\phi$ is comprised between 0 and $\pi$) and $\text{Sign}(-y)$ is equal to $+1$ if y is negative (or, which comes to the same thing, if $\phi$ is comprised between $\pi$ and $2\pi$). The behavior of this converter is not defined at the immediate vicinity of 0 nor on the axis where y is equal to 0. Reciprocally, a beam with a cylindrical symmetry polarization incident on the cylindrical face, whose polarization state distribution is given in the cylindrical system by $a.u_\phi+b.u_r$, this beam emerges from the cartesian face of the converter in the form of a beam whose polarization state distribution is uniform and given by $[a.u_x-b.\exp(j.\chi).u_y]*\text{Sign}(-y)$.

It will be noted that this is the emerging polarization direction which is of cylindrical symmetry, the sense thereof, which is not the same in the two half-parts of the component, being affected by $\text{Sign}(-y)$.

Let's note that the Stalder publication essentially discloses the use of a polarization converter in a configuration where the propagation direction of the beam goes from the cartesian face toward the cylindrical face, and where the incident polarization vector is aligned with one of the axes of the converter to generate either a radial or an azimuthal polarization beam. This publication does not disclose the use of such a converter to generate a generalized cylindrical polarization beam (generalized cylindrical vector beam, or generalized CV Beam), comprising radial and azimuthal components. This document neither discloses the use of such a converter with a beam propagating from the cylindrical face toward the cartesian face. In particular, the coupling of a generalized cylindrical polarization beam, comprising a linear combination of non-zero radial and azimuthal components, to the cylindrical face of such a converter to generate a spatially uniform polarization beam, is not described.

In other words, the Stalder and Schadt polarization converter is described, for the switch of a uniformly polarized wave to a cartesian system, by the following transformation matrix:

$$M_{xy \to \varphi r} = \text{Sign}(-y)\begin{pmatrix} 1 & 0 \\ 0 & -\exp(j \cdot \chi) \end{pmatrix}$$

where the phase shift $\chi$ depends on the wavelength.

For the switch from the cylindrical face to the cartesian face, the coordinate transforming matrix (with the coordinates expressed in the system relating to each face) is the following:

$$M_{\varphi r \to xy} = \text{Sign}(-y)\begin{pmatrix} 1 & 0 \\ 0 & -\exp(j \cdot \chi) \end{pmatrix}$$

It may be advantageous to use a perfect polarization converter, i.e. a converter for which $\chi$ is close to zero. Such a converter keeps the ellipticity of the incident polarization, the ellipticity of the emerging polarization being the same as that of the incident polarization. A converter that is suitable for implementing the invention is, according to a preferred embodiment, based on a liquid crystal converter.

Other embodiments of the invention may use other types of polarization converters, based for example on the use of segmented half-wave plate, cylindrical symmetry diffractive or sub-diffractive gratings.

A polarization converter can be used in the invention from the moment that, when passing therethrough, the matrix expressing the coordinates, in the cylindrical system, of the polarization of a beam emerging from the cylindrical symmetry face, as a function of the coordinates, in the cartesian system, of the polarization of the beam incident on the cartesian symmetry face, is diagonal, i.e. of the type:

$$M_{xy \to \varphi r} = \alpha \begin{pmatrix} 1 & 0 \\ 0 & \beta \end{pmatrix}$$

where the coefficients $\alpha$, $\beta$ of this matrix are uniform on each half of the component.

The converter thus makes it possible to transform an optical beam having a spatially uniform polarization state distribution into a beam having polarization state distribution of cylindrical symmetry about the optical axis.

A converter is also used to transform a beam having a cylindrical symmetry polarization state distribution into an optical beam having a uniform polarization state distribution in a cartesian system.

According to a preferred embodiment of the invention, schematically shown in FIG. 3, a same converter 10 is used in the two directions of propagation along the optical axis 8 of a focus lens 7: a first time in the cartesian-to-cylindrical direction of conversion and a second time in the cylindrical-to-cartesian direction of conversion. The light path passes two times through the converter 10, one time before striking the sample 5, and the second time, on the return way. On the other hand, the polarization conditioning 2 and analysis 3 components placed upstream and downstream, respectively, of the converter are different for the incident and the reflected beams. Moreover, no optical component is used to filter a particular eigen polarization (radial or azimuthal), because it is indeed desired to obtain information about the two polarizations (unlike the devices using a radial polarizer and not a polarization converter).

I. EMBODIMENTS OF THE INVENTION

1) Microscopic Resolution Ellipsometer

In the invention, a micro-ellipsometer is made, which is formed of two sub-units:
a conventional ellipsometer (or Mueller-meter), including an illumination arm 2 in which the emerging polarization is uniform in the cartesian system $u_x$ and $u_y$. It may be written $a.u_x+b.u_y$. The ellipsometer also comprises a detection arm 3, adapted to measure the input polarization state in the same system $u_x$, $u_y$. If the polarization entering into the detection arm is denoted $r_x.u_x+r_y.u_y$, the conventional ellipsometer measures the complex ratio $r_y/r_x$. In the case of an imaging ellipsometer, a cartography of $r_y/r_x$ is measured in the plane (x, y);

the polarization converter 10 and optical parts make it possible to intercept at the input, toward its cartesian face 11, all or part of the illumination arm of the ellipsometer, the eigen axes of its cartesian face 11 coinciding with the eigen axes of the ellipsometer, oriented by the vectors $u_x$ and $u_y$. At the output, the converter 10 sends all or parts of the emerging light toward the detection arm 3 of the ellipsometer. The light beam emerging from the cylindrical face 12 of the converter goes toward the microscope objective 7, the optical axis 8 of the objective 7 being aligned to the center O of the cylindrical face 12 of the polarization converter 10.

a microscope objective 7, placed substantially perpendicular to the sample 5 to be studied.

As regards the optical parts making it possible to send the beam of the illumination arm 2 toward the converter 10, and the beam emerging from the converter 10 toward the detection arm 3, separating plates 6 may be used. It is preferred to place the plane of incidence of these plates 6 and of the various interfaces, either along $u_x$ or along $u_y$, so as to permit a simple calibration of the amplitude and phase changes upon reflection, which could be expressed by $r_p/r_s$ different from 1.

2) Microscope Comprising an Ellipsometry Accessory

Let's start from a microscope suitable for episcopic polarized light observation, such as schematically shown for example in FIG. 8. Rather than limiting the influence of the incidence effects on the polarization by working in orthoscopic mode, or rather than using particular substrates, our approach is conceptually totally different. We start from a field of polarization of the incident light having a spatially uniform polarization state distribution, which is expressed in a cartesian system in the form of $a.u_x+b.u_y$, with a and b being constant over the object field (x, y). This polarization state distribution is transformed by means of components whose optical axes are uniform, so as to generate a cylindrical symmetry polarization field that is expressed by:

$$[a.u_\phi - b.\exp(j.\chi).u_r]*\text{Sign}(-y)$$

in the cylindrical system having for axis the optical axis 8 of the objective 7.

The factor $\exp(j.\chi)$ expresses the fact that there may be a phase shift between the radial component and the azimuthal component of the wave, introduced by the polarization converter 10. This transformation is operated by a polarization converter 10 whose main axes are oriented according to $u_x$, $u_y$, and whose center is on the optical axis 8 of the objective 7. In this system, the radial vector $u_r$ is in the plane of incidence and the orthoradial (also called azimuthal) vector $u_r$ is perpendicular to the plane of incidence. The reflected ray is thus expressed (if $r_p(\theta)$ and $r_s(\theta)$ are the coefficients of reflection under an angle of incidence $\theta$, for a polarization parallel and perpendicular, respectively, to the plane of incidence):

$$[r_p(\theta).a.u_\phi - r_s(\theta).b.\exp(j.\chi).u_r]*\text{Sign}(-y).$$

By passing back in the reverse direction through the polarization converter, the considered beam has a polarization that is expressed as follow:

$$[r_p(\theta).a.u_x + r_s(\theta).b.u_y]*\text{Sign}(-y)*$$
$$\text{Sign}(+y) = -[r_p(\theta).a.u_x + r_s(\theta).b.u_y].$$

The above formula remains valid whatever the azimuth $\phi$ with which the ray goes through the objective. Hence, all takes place as if the system according to the invention were "simplifying" the microscope objective into a "2D plane" objective having a single and same plane of incidence.

FIG. 4 schematically shows a microellipsometric device according to the prior art. A source 1 emits a light beam. In FIG. 4 are shown two rays 31a and 31b, parallel to the optical axis 8 of the lens 7 and located at a same distance from the optical axis 8, but at different azimuths. Polarization means (not shown) define a spatially uniform polarization state of the incident beam. The rays 31a (full line) and 31b (dashed line) have thus the same polarization state (shown as an elliptic polarization). The beams 31a and 31b are directed toward a lens 7 (or a microscope objective) of high numerical aperture. We consider the propagation of the two rays of same aperture and different azimuths (in full line and dashed line, respectively) through the lens 7, before and after reflection on the sample 5, i.e. in two planes of incidence. In a first plane of incidence, the ray shown in full line, the polarization beam 31a passes through the lens 7 and becomes the beam 32a incident on the sample. The lens 7 does not modify the polarization state of the transmitted beams 32a, 32b. The beam located in the first plane of incidence is elliptically polarized, with an axis of the polarization ellipse 32a located in its plane of incidence. Upon reflection on the sample 5, this beam undergoes an evolution and becomes a beam 33a whose major axis is multiplied by the coefficient of reflection $r_p$, relating to the reflection of a ray in the plane of incidence, and whose minor axis by $r_s$, relating to the reflection of a ray perpendicular to the plane of incidence. In a second plane of incidence, the ray in dashed line has a polarization ellipse 32b whose axis is no longer in the second plane of incidence after a first passing through the lens 7. After reflection on the sample 5, the polarization state 33b is different from the polarization state 33a in dotted line. Hence, the polarization state is not the same in distinct planes of incidence. Therefore, it is not possible to collect together rays as the dotted line ray and the dashed line ray to perform ellipsometric imaging. The ellipsometric signal thus depends on the plane of incidence (or the azimuth) under which they have passed through the lens, which makes the analysis complicated. As indicated in the prior art, it is then necessary to perform a azimuthal selection or to radially analyze the signal 33a, 33b as a function of the incidence angle and of the azimuth angle.

FIG. 5 makes it possible to explain how the invention operates. In the device of the invention (FIG. 5), a polarization converter 10 has been added, whose cylindrical symmetry face 12 is arranged on the side of the objective 7 and is centered to the optical axis 8 of the objective. The incident beam has a spatially uniform polarization state distribution. In FIG. 5, the rays 31a (full line) and 31b (dashed line) have an elliptic initial polarization, whose major axis is oriented parallel to the axis x of the polarization converter 10. At the output of the converter 10, the polarization ellipses 34a and 34b of the transmitted rays have their major axis in the radial direction, and when the rays 34a and 34b thereafter pass through the lens 7, this major axis is in the plane of incidence of each ray. In this case, for each of the rays, the polarization ellipse 35a, respectively 35b, undergoes the same evolution upon the reflection on the surface of the sample 5: the major axis of each ellipse is multiplied by the coefficient of reflection $R_p$, relating to the reflection of a ray in the plane of incidence, and the minor axis by $R_s$, relating to the reflection of a ray perpendicular to the plane of incidence. It can thus be noticed that the cylindrical symmetry of the polarization state distribution is neither modified by the reflection on the sample 5, nor by the second passing through the lens 7.

But, that is not all. On the return way, the polarization converter 10 also plays a deciding role, because it makes it possible, as seen on the ray drawn in dashed line, to put the polarization ellipse 36b back in the uniform cartesian system. Hence, all the rays of same angle of incidence, whatever their azimuth φ, which have a same polarization state 35a, 35b in a polar system before passing through the polarization converter 10, have also a same polarization state 36a, 36b in a cartesian system after having made a round trip through this converter 10 and the objective 7 (or the lens) of high numerical aperture. All these rays 36a and 36b carry "ellipsometric" information about the reflection under oblique incidence on the surface 5 and contribute in the same way to the ellipsometric signal for a same angle of incidence and a the considered wavelength, whatever their azimuth φ. It is then possible to sum up the contributions of the rays 36a and 36b so as to analyze them in a conventional manner, using a linear polarization analyzer, as it is current in ellipsometry and in Mueller-metry.

The arrangement of FIG. 5 is essential for performing imaging.

It will be noted that, for the sake of simplicity, FIG. 5 shows the case where the polarization converter 10 does not induce a phase shift between the two eigen polarizations ($\chi=0$). It is also an advantageous case because it may simplify the calibration. Moreover, obtaining $\chi=0$ over a wide range of wavelengths facilitates the work in white light, because this component is practically achromatic.

It will also be noted that due to the fact that each light ray travels to and fro through the polarization converter 10, with two azimuths that are different from each other by 180°, a polarization converter 10 may be used, which has a different phase shift as a function of the half-plane according to which it is passed through (this is the "Sign(−y)" in the above formulas, which corresponds to a phase shift of π when the ray passes through the component at an abscissa y>0). Indeed, a light ray reflecting on the sample surface passes the first time through the converter at a positive abscissa, and the other time at a negative abscissa. Accordingly, a uniform phase shift is obtained upon the round trip, whatever the azimuth of the ray.

FIG. 6 schematically shows the propagation of an elliptically polarized beam in some plane of incidence or other through a converter 10 and a microscope objective 7. An incident beam is defined by its spatially uniform polarization state 21. This polarized beam 21 is incident on the cartesian face 11 of the converter 10. The cylindrical face 12 of center 0 is centered on the optical axis 8 of the objective 7. The beam emerging from the cylindrical face 12 of the converter 10 has a polarization state distribution 22 of cylindrical symmetry about the axis 8. The objective 7 is chosen so as not to modify the polarization state of the beam. The beam 23 incident on the sample 5 is of cylindrical symmetry about the axis 8. After reflection, the elliptically polarized beam has its polarization state modified by the coefficients of reflection Rp and Rs of the sample. The reflected beam has a polarization state 24 modified compared to the beam 23. However, the incident beam having a cylindrical symmetry polarization distribution, in each plane of incidence, the modification of polarization is the same. On the return way, the beam 24 passes again through the objective 7, to form a polarized beam 25, which is incident on the cylindrical face 12 of the converter 10. The polarization state of the beams 22, 23, 24 and 25 is uniform in a polar coordinates system. After having passed through the converter 10 in the polar-cartesian direction, the beam 26 has thus a uniform polarization state distribution in a cartesian system. Due to the operation of the converter 10, all the planes of incidence are equivalent to that shown in FIG. 6 and have the same contribution to the signal.

The use of the polarization converter 10 located just upstream of the objective 7 and in the round trip path of the light, the orientation of an analyzer, of a polarizer and possibly of a compensator located downstream of the polarizer or upstream of the analyzer, makes it possible to effectively define and analyze the polarization state with respect to the plane of incidence on the sample. The positions of the different components are marked in the system $u_x$, $u_y$ defined by the cartesian axes of the polarization converter 10.

Moreover, it will be noted that the sensitivity of the ellipsometric technique is particularly high in the vicinity of the Brewster angle $\theta_B$ of the substrate used, where the angle $\theta_B$ is equal to Arctan(N), with N being the index of the substrate. Angles of incidence of 60° or more may be used, which corresponds to a numerical aperture higher than 0.85. An objective with a numerical aperture of 0.9 or more, such values being available on commercial objectives, is advantageously used. Nevertheless, angles of incidence from 45°, i.e. numerical apertures higher than 0.7, may be used. Yet, it will be noted that it is important that the objective 7 used does not modify the radial polarization state distribution. It is important that the objective 7 has no birefringence liable to heterogeneously or randomly modify the spatial polarization state distribution. Preferably, an objective 7 compatible with the polarized light observations or an objective of the Nomarski type compatible with the interferential contrast observation are used.

Finally, it is quite conceivable to perform ellipsometric measurements in immersion, which allows the Brewster conditions to be easily reached. In the case of an immersion objective, the Brewster angle $\theta_B$ is equal to Arctan $(N/N_{immersion})$, where N is the index of the substrate and $N_{immersion}$ is the index of the medium of immersion.

FIG. 8 shows a microscope operating in polarized light mode according to the prior art. The microscope comprises an illuminator 27, generally of the Kohler type. The illuminator 27 comprises a light source 1 placed behind a ground glass 1a, an aperture diaphragm 16a, a field diaphragm 17a, and several lenses 1b, 18b, 18c. The tube of the microscope comprises a separating plate 6, an objective 7 of optical axis 8, a tube lens 9, a pupil 19, a field diaphragm 17a or 17b, an eyepiece 20 and a sensor 4. To operate in polarized light, the microscope comprises a polarizer 13 in the illumination arm, and/or an analyzer 14 in the detection arm. The orientation of the polarizer 13 and/or analyzer 14 axes allows the observation of the sample 5 between crossed polarizers, for example.

FIG. 9 shows an ellipsometric microscope according to an embodiment of the invention. The components of the microscope of FIG. 8 are present. Furthermore, the microscope comprise a converter 10 inserted between the separating plate 6 and the objective 7. To select a given angle of incidence θ, an annular diaphragm 16 is advantageously used, which is inserted at the level of the aperture diaphragm 16a of the microscope or in a plane that represents a plane of Fourier of the sample 5. Orienting the components 13 (polarizer), 14 (analyzer) and/or 15, 15' (compensator) may allow searching for the conditions close to the "nulling ellipsometry", adapted to null the emerging light at the sensor 4, so as to bring out the smallest variations of properties on the surface 5 to be observed. All the prior knowledge relating to the observation in conditions of nulling ellipsometry may then be reused, but with benefiting from the commodity that the incidence is obtained by means of a single objective whose axis is merged with the normal to the sample.

Two modes of use of the system may be distinguished:
- an "imaging" mode, when the image formed on the eyepiece or the camera 4 is that of the sample, for a given angle of incidence G. The system is then an "ellipsomicroscope" (illustrated in FIG. 9);
- a mode "ellipsometric signal function of the angle of incidence" (illustrated in FIGS. 10 and 11). If it is chosen to focus the interest on the ellipsometric signal function of the angle of incidence θ, over a given area of the sample, in which case the field diaphragm 17a or 17b is closed, a Bertrand lens 28 is placed, and the reflected signal is directly obtained on the display device of the microscope, as a function the incidence θ and of the azimuth φ of the incident polarization. Contrary to the azimuthally resolved ellipsometric devices, which do not use a polarization converter, each circle of observation corresponding to a given incidence is homogeneous (for the case of an isotropic sample) and may thus be directly integrated. The ellipsometric signal is relating to the light spot created by the microscope objective 7. This spot may be made very small (about ten μm, or 5 μm, or even 1 μm), by limiting the field diaphragm to a very small aperture. The system is then a "micro-ellipsometer". The device of the invention hence does not require the use of a radial analyzer, of a complex system of radial imaging, or of signal processing.

It can be observed that the device may operate both in episcopic mode (i.e. the light illuminates the sample by passing through the objective), or in diascopic mode. In diascopic mode, two polarization converters are then required, a first cartesian-cylindrical converter 10 between the polarizer and the objective, and a second cylindrical-cartesian converter 10' between the objective and the analyzer.

To increase the contrast and the signal/noise ratio of an ellipsometric contrast microscope, a low modulation of the two polarization components around the nulling position and a synchronous detection of image with respect to each of these modulations may advantageously be used. A first modulation may for example be applied by a small rotation of the analyzer around its nulling position. Another solution consists in slightly modulating the retardation of a compensator made from a voltage-controlled plate of nematic crystals, by slightly modifying the voltage applied to this voltage-controlled retardation plate around the value permitting the nulling.

3) Ellipsometric Contrast Microscope

The invention is considered as making it possible to open a new field of applications in microscopy, by proposing an ellipsometric contrast microscope that is self-compensated over a wide range of incidence and of wavelength.

This extension of the invention consists in a manner to observe (by imagery) with an increased contrast objects having one or two very small dimensions (from 10 nm to less than one tenth of nm), without being limited to a wavelength, nor to an incidence range for the illumination, while benefiting from the ellipsometric contrast. The fact of being capable of working with all the numerical aperture of the objective is an advantage in terms of lateral resolution.

In order to better explain this extension of the invention, we will first describe in detail, within the Jones matrix formalism, what happens on a trip that passes through the polarization converter 10, the high aperture objective 7, upon the reflection on the sample 5, and on a return trip, as schematically shown in FIG. 6. The output polarization vector is obtained by calculating the product of the output polarization vector by the matrix $M_1$ obtained by multiplying each of the Jones matrices of the individual components:

$$M_1 = \text{Sign}(-y)\begin{pmatrix} 1 & 0 \\ 0 & -\exp(j \cdot \chi) \end{pmatrix}$$

$$\begin{pmatrix} t_s & 0 \\ 0 & t_p \end{pmatrix}\begin{pmatrix} r_s & 0 \\ 0 & r_p \end{pmatrix}\begin{pmatrix} t_s & 0 \\ 0 & t_p \end{pmatrix}\text{Sign}(y)\begin{pmatrix} 1 & 0 \\ 0 & -\exp(j \cdot \chi) \end{pmatrix}$$

It is to be noted that we work in cylindrical coordinates in the space located after the polarization converter 10 and in cartesian coordinates in the system x, y, for the beams denoted by 21 and 26 in FIG. 6. $t_p$ and $t_s$ are the coefficients of transmission through the objective or the lens 7. For a high aperture, there is generally a significant phase difference between $t_p$ and $t_s$.

Calculation gives:

$$M_1 = -\begin{pmatrix} r_s \cdot t_s^2 & 0 \\ 0 & r_p \cdot t_p^2 \exp(2j \cdot \chi) \end{pmatrix} = -r_s \cdot t_s^2 \begin{pmatrix} 1 & 0 \\ 0 & (t_p/t_s)^2 \exp(2j \cdot \chi) \cdot r_p/r_s \end{pmatrix}$$

In the case where the interest is focused on the ellipsometric quantity $r_p/r_s$, one can determine by various measurements and calibration $(t_p/t_s)^2 \exp(2j \cdot \chi)$, which depends both on the wavelength and on the angle of incidence. Elements that have, in the cartesian system (x, y), a Jones matrix allowing the influence of $(t_p/t_s)^2 \exp(2j \cdot \chi)$, and in particular the variations thereof as a function the wavelength, to be reduced, may also be placed in the optical path, in the "cartesian" area. The way to design a system based on retardation or dichroic plates for that purpose is known by the one skilled in the art. However, such compensation system might have its best operation for a limited range of incidence and of wavelength.

Let's consider now the case where it is desired to perform imagery of objects of extremely small thickness (from a few tenths of nm to a few nm), and having very low-contrast optical properties (transparent objects, for example), arranged on a planar substrate. The ellipsometric quantity $r_p/r_s$ of the substrate will be modified into $r_{p1}/r_{s1}$ at these objects, and the expected advantage of the ellipsometric contrast imagery is to reveal with a very good contrast those little variations, by nulling as much as possible, the signal of the bare substrate.

For that purpose, a particular embodiment of the invention, illustrated by FIG. 7, consists in seeing to it that each ray contributing to the formation of the image follows a path that compensates for the factor linked to the instrument and to the bare substrate:

$(t_p/t_s)^2 \exp(2j \cdot \chi) \cdot r_p/r_s$

For that purpose, a second sub-unit polarization converter 10'—objective 7' (or high numerical aperture lens) is used, which is identical to that used for observing the object 5. This second sub-unit comprises a reference substrate $5_{REF}$, fully free of defects and of objects to be examined, and preferably identical to the substrate that is used for the examination of the objects. The second unit is arranged so that the path inside the second unit polarization converter 10'—objective 7'—reference substrate $5_{REF}$, is passed through by all the rays that serve to constitute the ellipsometric contrast image, in the same incidence angle conditions, but with a polarization configuration rotated by 90°: a ray linearly polarized according to the axis "$x_1$" of the first unit will pass through the second parallel to the axis "$y_2$" of the second unit.

Therefore, the matrix corresponding to the passing through the two units is of the following form:

$$M = M_1 \cdot M_2 = \begin{pmatrix} r_{s1} \cdot t_s^2 & 0 \\ 0 & r_{p1} \cdot t_p^2 \exp(2j \cdot \chi) \end{pmatrix} \begin{pmatrix} r_p \cdot t_p^2 \exp(2j \cdot \chi) & 0 \\ 0 & r_s \cdot t_s^2 \end{pmatrix} =$$

$$r_{s1} \cdot r_p \cdot (t_p t_s)^2 \exp(2j \cdot \chi) \begin{pmatrix} 1 & 0 \\ 0 & (r_{p1}/r_{s1})/(r_p/r_s) \end{pmatrix}$$

The factor in front of the matrix represents an attenuation and a phase shift that are independent on the polarization, whatever the incidence and the wavelength. An observation between crossed polarizers makes it possible to easily isolate a contrast linked to the difference between $(r_{p1}/r_{s1})/(r_p/r_s)$ and one. A small modulation of a phase shift may be added to allow the detection of the phase of the quantity $(r^{p1}/r_{s1})/(r_p/r_s)$.

It is to be noted that those measurements may be performed over a wide angular incidence range and over a wide wavelength range.

Therefore, a new type of microscope is obtained.

It is to be noted that the performances of this new microscope may be further improved by arranging a Digital Interference Contrast device (also referred to as Nomarski).

FIG. 7 shows an example of an ellipsometric contrast microscope that is self-compensated over the whole spectrum and incidence range.

Two identical units polarization converters—objective—semi-transparent mirror, focused one on a reference substrate $5_{REF}$, the other on a substrate comprising objects to be observed 5, are arranged in such a way that a ray emerging from the light source, arriving on the converter 10 linearly polarized parallel to the direction $y_1$ (converted into a radial polarization by the converter, according to our notation convention), arrives on the second converter 10' with a polarization according to the direction $x_2$ of this second converter 10' (i.e. converted into an azimuthal polarization). Reciprocally, a light ray emerging from the source and incident on the converter 10 with a linear polarization parallel to $x_1$, is incident on the second converter 10' with a polarization parallel to $y_2$. Therefore, a ray 28, in a first plane of incidence, is polarized linearly according to a direction p parallel to the plane of incidence. After passing through the converter 10, its polarization state is radial and thus remains to a polarization state of type p. After passing through the objective 7, reflection on the sample 5, the polarization state of the beam remains p up to the second converter unit 10' (shown in top view). The axes $(x_2, y_2)$ of the second converter 10' being oriented at 90 degrees with respect to the axes $(x_1, y_1)$ of the first converter 10, the beam becomes, after having passed through the converter 10', a beam of transverse polarization or s. This s polarized beam is then incident on the reference sample $5_{REF}$.

In the same way, a beam 27, in a second plane of incidence oriented at 90 degrees with respect to the first plane of incidence. The beam 27 is initially linearly polarized. After passing through the converter 10, the polarization state is radial and according to a polarization direction of type p. After passing through the objective 7, reflection on the sample 5, the polarization state of the beam remains p up to the second converter unit 10' (in the top view). The axes $(x_2, y_2)$ of the second converter 10' being oriented at 90 degrees with respect to the axes $(x_1, y_1)$ of the first converter 10, the beam 27 becomes, after having passed through the converter 10', a beam of transverse polarization or s. This polarized beam s is then incident on the reference sample $5_{REF}$.

A same beam is thus incident according to polarization directions that are respectively p on the sample 5 to be observed, then s on the reference sample $5_{REF}$ (and vice versa).

Upstream and downstream of this device are the illumination arm 2 and detection arm 3 of a conventional ellipsometric imager. Preferentially, a polarizer 13, a compensator 15 and an analyzer 14 will be used, which corresponds to the configuration of a standard nulling ellipsometer. Preferably, the linear polarizer 13 is oriented so that the axis of the polarization vector incident on the first converter 10 is inclined by an angle comprised between 20 and 70° relative to the axis $y_1$, and more preferably, inclined by 45°+/−10°.

The device may further comprise optical separating means (semi-transparent mirror, separating plate 6 or other), to separate the incident beam from the beam reflected by the sample. These beam separating means are preferably arranged, on the one hand, between the polarizer 13 and the converter 10, and on the other hand, between the converter 10 and the analyzer 14.

4) Ellipsometer and Microscope Combination

It is well known that, in order to obtain higher performances in terms of ellipsometric measurement quality, it would be better to prefer the modulation ellipsometers to the nulling ellipsometers. To benefit from the accuracy of a modulation ellipsometer, a microscope may be modified by interposing an ellipsometric illumination arm 2 downstream of the light source, an ellipsometric analysis arm 3 upstream of the sensor 4 and a polarization converter 10 immediately upstream of the objective 7. One of the ellipsometric arms preferably includes a dynamic polarization modulator. The components of the illumination and analysis arms are oriented with respect to the $u_x$, $u_y$ system of the converter, in the same way as they are with respect to the directions p and s. The ellipsometric quantity calculations are performed in a conventional way.

Moreover, it will be noted that, in all the areas of the microscope where the light rays have a low inclination with respect to the normal, polarization components with a cartesian symmetry can be introduced without difficulty, because the cylindrical symmetry polarization effects, linked to the incidence on the lenses, are low. This is the case of the areas located before and after the separator of an episcopic microscope, on the illumination and on the observation sides (illumination channel and "tube" of a confocal microscope), respectively. The polarization control and modulation components are thus preferentially arranged in these areas.

In a number of ellipsometers (with a photoelastic modulator or with a rotating compensator), one of the arms (illumination or detection) comprises a single polarizer whose linear polarization axis is oriented at 45 degrees relative to the direction P. It advantageous to use the polarizer present in a microscope and oriented so that the linear polarization incident on the polarization converter is located at 45° (within +/−)15° relative to the axis $u_x$ of the converter and to add a polarization modulation ellipsometric detection arm at the level or after the microscope tube, which is the portion of the optical path that is close to the eyepiece and/or of the visualization camera. As an alternative, it may be preferred to add the modulation on the lighting arm, after the source, and to use the analyzer as an ellipsometric analysis arm, oriented so that the linear polarization incident on the polarization converter is located a 45° (within +/−)15° relative to the axis $u_x$ of the converter.

It will be noted that, due to this orientation of about 45°, the polarization state of the light incident on the sample is neither purely radial nor purely azimuthal, but comprises a combination of the two radial and azimuthal polarization components. Therefore, the device of the invention makes it possible to generate an incident beam having a combined radial and azimuthal incident polarization state, which is different from the polarization state generated in prior art devices, in which a polarization converter is used essentially as an either radial or azimuthal polarizer.

5) Mueller-Meter and Microscope Combination

Similarly, a device that measures the Mueller matrix may be combined with a microscope. For example, the Mueller-matrix measuring device sold by Jobin Yvon under the name of MM16 ellipsometer, comprising an illumination arm and a detection arm may be arranged with, downstream, a polarization converter and a high aperture lens (N.A.>0.5, preferably N.A.>0.8) or a microscope objective (having a high aperture too, the better being N.A.>=0.9, but it is possible to work from N.A.>0.5).

According to a variant of this embodiment, a microscope is combined with a Mueller imager, as described in "Mueller Polarimetric Imaging System with Liquid Crystals", B. Laude-Boulesteix, A. De Martino, B. Drévillon, and L. Schwartz, Applied Optics, Vol. 43, Issue 14, pp. 2824-2832 (2004).

II. VARIANTS OF THE INVENTION

Some particular operating modes of the invention that may be applied to all the preceding devices will now be described.

1) Spectroscopic Operation

According to a particular embodiment, as it is conventional in the field of ellipsometry, we work at a fixed wavelength, corresponding to the wavelength of emission of the source (laser or diode, for example), or at a wavelength spectrally filtered by means of a filter or a monochromator.

According to another particular embodiment, a spectrometer is advantageously used at the level of the detection to obtain spectroscopic measurements.

2) Several Wavelength Imaging Operation

When performing ellipsometric contrast imagery with an extinction ellipsometer, the extinction setting generally operates only on a restricted wavelength range, because the ellipsometric quantities depend on the wavelength (and also because of the chromatism of certain optical components, such as a retardation blade). In this case, the wavelength range is adjusted so as to obtain good conditions of extinction.

However, when transparent or low thickness objects are observed on transparent substrates, such as glass, whose index varies a little with the wavelength, the conditions of extinction may be stable over a great wavelength range. Then, an achromatic compensator is preferably used to benefit from a high ellipsometric contrast in white light.

So that spectroscopically resolved ellipsometric information can be obtained about the objects arranged on the transparent substrate, one conventional color camera, or several cameras equipped with wavelength filters, are advantageously used.

3) Calibration Procedures

When passing through a high-aperture microscope objective, the light rays generally undergo a phase shift that depends on the wave polarization, the eigen polarizations corresponding to a linear polarization in the radial plane of the objective (denoted by $u_r$), or in its azimuthal plane (denoted by $u_\phi$). Let's denote generally by $t_r$ and $t_\phi$ the transmission coefficients for these two eigen polarizations over the whole "cylindrical symmetry" domain delimited by the polarization converter, corresponding to the round trip in the objective for a reflection system or to the passing through the condenser and the objective for a transmission system). The coefficients $t_r$ and $t_\phi$ depend on the distance r to the axis 8 of the objective 7 (that can be linked to the angle of incidence 8 when the field diaphragm is rather closed).

The ellipsometric measurement indeed does not give $r_p/r_s$ but gives $(r_p.t_r)/(r_s.t_\phi)$. $t_r/t_\phi$ is measured by performing en ellipsometric measurement on a reference substrate, for various angles of incidence θ. The ellipsometric measurement of the objective effect can then be corrected.

4) Multi-Incidence Angle

In the case where very thin samples on a substrate are observed by imagery, it is desired to increase the light flow intended to the observation. According to a particular embodiment, a retardation plate (commonly called quarter-wave plate) is arranged in the plane of the aperture diaphragm. A plate whose axes are uniform in the cartesian system, but whose thickness varies as a function of the distance to the optical axis so as to introduce a retardation adapted to the angle of incidence, is preferably used. This plate makes it possible to keep good conditions of nulling of the ellipsometric background.

According to another particular embodiment, a colored filter comprising three color rings as well as diaphragm rings are further arranged, in the plane of the aperture diaphragm, to allow associating three different incidence ranges with three different colors. The direct observation of the obtained image using a three-color camera (RGB, for example) makes it possible to extract images corresponding to the different angles of incidence, respectively.

5) Operation in Scatterometer Mode

According to another embodiment of the invention, rather than the specularly reflected ray, it is also possible to analyze the angularly diffused light. For that purpose, an annular aperture diaphragm is used and the polarization is analyzed by means of a lens of the Bertrand lens type placed in the microscope tube, in a configuration of analysis of the normal incidence ellipsometric signal.

6) Joint Use of an Ellipso-Microscope or an Ellipsometric Contrast Microscope with an Interferential Contrast Device (Also Referred to as "Nomarski")

According to still another embodiment of the invention, the benefits of the ellipsometric and Nomarski contrast imageries are conjugated by modifying a microscope equipped with a Nomarski contrast device (also called Differential Interference Contrast), to add thereto:

a polarization converter between the Nomarski prism and the objective, the converter being centered to the objective axis, its "cartesian" face being on the Nomarski side, its "cylindrical symmetry" face being of the objective side, and its eigen directions $u_x$, $u_y$, being substantially parallel to the eigen directions of the Nomarski prism, and at 45 degrees relative to the axes of the polarizer;

an annular aperture diaphragm, for selecting an incidence range;

an orientable retardation plate located before the analyzer.

This system is used by searching for the conditions for nulling the ellipsometric contrast and by thereafter inserting the Nomarski prism.

According to a variant of this embodiment, the roles of the analyzer and of the polarizer may be interchanged, provided that the retardation plate is placed after the polarizer.

7) Use as a Large Field and High Incidence Imaging Ellipsometer

Thanks to the use of a high numerical aperture and low magnification objective, a large field imaging ellipsometer is obtained.

As exposed hereinabove, the principle of the invention allows new and very promising applications.

The double passage of light through the converter to perform, on the first trip, a "cartesian to cylindrical" conversion, and on the return trip, a "cylindrical to cartesian" conversion, avoid using a radial analyzer and a complex signal processing system dedicated to a radial geometry. On the contrary, the device of the invention allows using a linear analyzer and standard detection means.

Unlike the prior radial polarization conversion polarimetric devices, the invention uses at the level of the sample a beam with a polarization distribution of the generalized cylindrical type, comprising some polarization state or other, which is neither purely radial, i.e. p, nor purely circumferential, i.e. s. This is fundamental in ellipsometry, because the interest is focused on the ratio $r_p/r_s$. Yet, in the prior polarimetric devices that use only either one or the other of the polarization states p (in radial mode) or s (in azimuthal mode), it is not possible to extract information about the ratio $r_p/r_s$.

In the field of ellipsometry, the invention makes it possible to obtain ellipsometric measurements with a high optical magnification, while keeping an excellent luminosity, so that micrometric resolution measurements of the sample can be obtained.

In the field of microscopy, it becomes possible to modify a standard microscope to transform it into a micro-ellipsometer by inserting a polarization converter accessory. Finally, in the field of the imaging microscopes, the invention makes it possible to improve the contrast of the images by a high-performance ellipsometric contrast device.

The invention claimed is:

1. An amplitude and phase polarimetric measurement device of the ellipsometric measurement or Mueller ellipsometry measurement or scatterometric measurement type, said polarimetric measurement device having a microscopic resolution and comprising:
   an excitation part comprising:
   a light source capable of emitting an incident light beam over a wavelength domain, and
   a polarization state generator capable of generating an incident optical beam having a spatially uniform polarization state distribution;
   an optical focussing device having an optical axis to focus said incident light beam on the surface of a sample to be measured;
   an analysis part comprising:
   an optical collection device for collecting the light beam reflected or transmitted by the sample, said optical collection device having an optical axis;
   a polarization state analyzer capable of receiving the optical beam collected by said optical collection device and of analyzing the polarization state of said optical beam according to a cartesian polarization state basis;
   a detector capable of receiving said light beam that is polarization analyzed by the analyzer;
   said polarization state generator and/or said polarization state analyzer further comprising a polarization modulator,
   wherein:
   said optical focussing device is arranged so that said optical axis of said optical focussing device is merged with the normal to the sample;
   said optical collection device being arranged so that said optical axis of said optical collection device is merged with the optical axis of said reflected or transmitted light beam;
   the excitation part comprises a first polarization conversion device arranged between said polarization state generator and said optical focussing device, said first polarization conversion device being oriented so as to receive said incident optical beam of spatially uniform polarization and to convert it into a beam with a polarization vector distribution of cylindrical or semi-cylindrical symmetry about the optical axis and according to which each polarization vector comprises a linear combination of a non-zero radial component and a non-zero azimuthal component; and
   the analysis part comprises a second polarization conversion device arranged between said optical collection device and said polarization state analyzer, said second polarization conversion device being oriented so as to receive said collected light beam, said second polarization conversion device being capable of converting a beam with a polarization vector distribution of cylindrical symmetry according to which a polarization vector comprises a linear combination of a radial component and an azimuthal component of polarization into a beam with a spatially uniform polarization state distribution.

2. The polarimetric measurement device according to claim 1 wherein, characterized in that the first polarization conversion device and the second polarization conversion device are formed by a single polarization converter used in two opposite directions of propagation, and in that said optical focussing device and collection device are merged.

3. The polarimetric measurement device according to claim 2, wherein said single polarization converter is a liquid crystal converter comprising a cartesian symmetry face and a cylindrical symmetry face.

4. The polarimetric measurement device according to claim 2, wherein said single polarization converter is a polarization converter capable of converting the polarization state distribution from a cartesian to a cylindrical system, while keeping the polarization state of the beam.

5. The polarimetric measurement device according to claim 1, wherein the polarization state generator is a spatially uniform linear polarizer, and wherein the polarization axis of said linear polarizer is oriented with respect to an eigen axis of the first polarization conversion device so as to form a non-zero angle.

6. The polarimetric measurement device according to claim 1, wherein the polarization state analyzer is a spatially uniform linear analyzer and wherein the polarization axis of said linear analyzer is oriented with respect to an eigen axis of the second polarization conversion device so as to form a non-zero angle.

7. The polarimetric measurement device according to claim 2, further comprising an optical separation device for separating the beam incident on the sample from the beam reflected or transmitted by the sample, said optical separation device being arranged in the optical path between the polarization state generator and the single polarization converter.

8. The polarimetric measurement device according to claim 1, further comprising at least one of a field diaphragm, an aperture diaphragm and a spectroscopic analyzer for the detected signals.

9. The polarimetric measurement device according to claim 3, wherein said polarimetric measurements are ellipsometric measurements, Mueller ellipsometry measurements or scatterometry measurements, the matrix of said first and second polarization conversion devices that expresses the coordinates, in the cylindrical system, of the polarization of a beam emerging from the cylindrical symmetry face, as a function of the coordinates, in the cartesian system, of the polarization of the beam incident on the cartesian symmetry face, being of the diagonal type:

$$M_{xy \to \varphi r} = \alpha \begin{pmatrix} 1 & 0 \\ 0 & \beta \end{pmatrix}$$

where the coefficients $\alpha$, $\beta$ are uniform in each half of the component.

10. The polarimetric measurement device according to claim 1, further comprising a Nomarski prism, wherein the first polarization conversion device being located between the Nomarski prism and said optical focussing device.

11. An amplitude and phase polarimetric measurement accessory of the ellipsometric measurement or Mueller ellipsometry measurement or scatterometric measurement type, for a microscope, comprising:
 a polarization state generator capable of receiving an incident optical beam and of generating an optical beam having a spatially uniform polarization state distribution;
 a polarization state analyzer;
 a polarization modulation device arranged between said polarization state generator and said polarization state analyzer, and
 a radial or cylindrical polarization converter arranged in the optical path, between the polarization state generator and the microscope objective (7) and between the microscope objective and the polarization state analyzer,
 said converter being oriented with respect to the polarization state generator so as to convert a beam propagating in a first axial direction of propagation and having a spatially uniform polarization state distribution into a beam with a polarization vector distribution of cylindrical symmetry about the optical axis, according to which each polarization vector comprises a linear combination of a non-zero radial component and a non-zero azimuthal component, and reciprocally said converter converting a beam propagating in a second axial direction, counter-propagative to the first direction, and having a polarization vector distribution of cylindrical symmetry about the optical axis into a beam with a spatially uniform polarization state distribution.

12. The accessory according to claim 11 wherein the accessory is combined with an imaging microscope ellipsometer, further comprising a microscope objective of numerical aperture higher than or equal to 0.7, and an imaging sensor.

13. The accessory according to claim 11 wherein the accessory is combined with an ellipsometric contrast microscope, comprising:
 a first converter to direct an optical beam toward a sample to be measured,
 a second converter to direct the optical beam reflected or transmitted by the sample toward a reference substrate,
 said first and second converters having eigen axes oriented at 90 degrees relative to each other.

14. A method for amplitude and phase polarimetric measurement of the ellipsometric measurement or Mueller ellipsometry measurement or scatterometric measurement type, comprising:
 generating an incident light beam having a spatially uniform polarization state distribution;
 converting a polarization vector distribution of said incident beam into a polarization state distribution having a cylindrical or semi-cylindrical symmetry about the optical axis, according to which each polarization vector comprises a linear combination of a non-zero radial component and a non-zero azimuthal component;
 focusing said cylindrical or semi-cylindrical symmetry polarization beam on a surface of a sample to be measured according to an optical axis merged with the normal to the sample;
 collecting the light beam reflected or transmitted by the sample;
 converting the spatial polarization state distribution of the collected beam so as to convert a polarization state distribution of cylindrical symmetry about the optical axis into a spatially uniform polarization state distribution;
 analyzing the polarization state of the collected and polarization converted beam; and
 detecting the analyzed beam.

15. The polarimetric measurement method according to claim 14, further comprising at least one of:
 spectroscopically analyzing the detected beam;
 detecting an image of the sample surface on an imaging sensor; and
 detecting an image of an optically conjugated plane of the sample surface.

* * * * *